(12) United States Patent
Reynolds et al.

(10) Patent No.: US 12,513,164 B2
(45) Date of Patent: Dec. 30, 2025

(54) DATA DEVALUATION THROUGH SMART CONTRACTS

(71) Applicant: Wells Fargo Bank, N.A., San Francisco, CA (US)

(72) Inventors: Jerry Reynolds, Charlotte, NC (US); Venkat Sriram Karicherla, Apex, NC (US); Michael Sbandi, Harrisburg, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 129 days.

(21) Appl. No.: 18/351,147

(22) Filed: Jul. 12, 2023

(65) Prior Publication Data

US 2025/0023888 A1 Jan. 16, 2025

(51) Int. Cl.
*H04L 9/40* (2022.01)
(52) U.S. Cl.
CPC ............ *H04L 63/1416* (2013.01); *H04L 9/40* (2022.05); *H04L 63/1441* (2013.01)
(58) Field of Classification Search
CPC ... H04L 63/1416; H04L 9/40; H04L 63/1441; H04L 9/3239; H04L 9/50
USPC .......................................................... 726/22
See application file for complete search history.

(56) References Cited

U.S. PATENT DOCUMENTS 9,537,887 B2 1/2017 Choi et al.
10,831,890 B2 * 11/2020 Rane ..................... G06F 21/554

2006/0101516 A1 * 5/2006 Sudaharan .......... H04L 63/0263
726/23
2007/0192585 A1 8/2007 Briancon et al.
2019/0190947 A1 * 6/2019 Nsouli ................ H04L 63/1441
2020/0159697 A1 * 5/2020 Wood .................... G06F 16/162
(Continued)

FOREIGN PATENT DOCUMENTS

KR 20030033713 A 5/2003
KR 20030052843 A 6/2003

OTHER PUBLICATIONS

Caldwell et al., "A Critique of Active Defense or 'Hack Back'", International Journal for Information Security Research (IJISR), vol. 10, No. 1, Dec. 2020, pp. 957-961.
(Continued)

*Primary Examiner* — Badri Narayanan Champakesan
(74) *Attorney, Agent, or Firm* — Shumaker & Sieffert, P.A.

(57) ABSTRACT

A system for a business entity is disclosed that is configured to execute an authorized countermeasure against a malicious actor via a smart contract in response to the system determining that the malicious actor has performed a malicious action. The system determines that a smart contract established between the business entity and an official agency defines an authorized countermeasure to be performed in the event of the malicious action. The system also determines that the malicious actor has performed the malicious action on the business entity. In response to the determination that the malicious actor has performed the malicious action, the system executes the authorized countermeasure with respect to the malicious actor, which may include one or more of a ransomware attack, a malware distribution, a beacon, a Distributed Denial of Service attack, a destruction of data, an encryption of data, a tokenization of data, or a scrambling of data.

15 Claims, 4 Drawing Sheets

(56) References Cited

U.S. PATENT DOCUMENTS

| | | | |
|---|---|---|---|
| 2021/0319099 A1 | 10/2021 | Gaddam et al. | |
| 2021/0342803 A1* | 11/2021 | Yoo | G06Q 20/102 |
| 2022/0067147 A1* | 3/2022 | Schmid | G06F 9/45558 |
| 2024/0039938 A1* | 2/2024 | Yadav-Ranjan | H04L 63/1425 |
| 2024/0160533 A1* | 5/2024 | Lakkundi | H04L 63/1416 |
| 2024/0411314 A1* | 12/2024 | Manouchehri | G05D 1/226 |
| 2024/0411866 A1* | 12/2024 | Djeyassilane | G06F 21/552 |

OTHER PUBLICATIONS

Welker et al., "Improving the Cybersecurity Framework for Future Consumer Networks", International Journal of Communications, Network and System Sciences, vol. 14, Apr. 30, 2021, pp. 47-54.

* cited by examiner

DATA DEVALUATION THROUGH SMART CONTRACTS

TECHNICAL FIELD

The disclosure relates to computer-based systems for executing authorized countermeasures against malicious actors via smart contracts.

BACKGROUND

Smart contracts are computer programs that facilitate, verify, and enforce terms of a contract. Unlike traditional paper contracts, which rely on intermediaries such as lawyers, banks, or notaries to ensure compliance, smart contracts operate automatically and transparently on a blockchain or other distributed ledger technology (DLT) platform. Smart contracts can encode complex logic, execute conditional transactions, and manage assets without human intervention, thereby reducing costs, risks, and delays associated with manual processing. Smart contracts have a wide range of potential applications in various industries, such as finance, real estate, supply chain, insurance, and intellectual property. Smart contracts can also enhance privacy, security, and accountability by using cryptographic techniques, consensus mechanisms, and audit trails to protect sensitive data and prevent fraud or errors.

SUMMARY

The disclosure describes techniques for executing an authorized countermeasure against a malicious actor via a smart contract in response to a system determining that the malicious actor has performed a malicious action. A system for a business entity establishes the smart contract with an official agency, wherein the smart contract defines the authorized countermeasure to be executed. To establish the smart contract, the system processors may be configured to participate in a negotiation with the official agency. To determine whether a malicious actor has performed a malicious action that would call for the authorized countermeasure, the system processors may be configured to execute a machine learning model trained to detect the malicious action using historical data including good and malicious behavior incidents associated with the business entity. Responsive to the system determining that a malicious actor has performed a malicious action, the system then executes the authorized countermeasure with respect to the malicious actor. In some examples, the system executes a countermeasure such as a ransomware attack, a malware distribution, a beacon, a Distributed Denial of Service (DDOS) attack, an encryption of data, a tokenization of data, or a scrambling of data. In some examples, wherein the malicious action comprises unauthorized access to data of the business entity, the system executes an authorized countermeasure that comprises destruction (e.g., an erasure of the data or an overwriting of the data in an unreadable data format). The system processors may store data for the smart contract, the detection of the malicious action, and the performance of the authorized countermeasure to a blockchain system. Further, responsive to determining that a malicious action has been performed and executing an authorized countermeasure in response, the system processors may send a notification to the official agency indicating the events that took place.

The techniques described herein may provide one or more benefits or advantages. The disclosed techniques may protect a business entity and its customers from malicious actors. Malicious actors can cause significant harm to a business entity and its customers by performing various types of malicious actions, such as stealing sensitive data, disrupting critical services, or outputting false information. In the instance of these malicious events, the business entity may collaborate with an official agency, such as a law enforcement agency, a regulatory authority, or a cybersecurity agency, to establish authorized countermeasures that can be executed against the malicious actors. However, traditional methods of cooperation between a business entity and an official agency can be slow, costly, and prone to errors or biases. Moreover, they may require a significant amount of manual effort, paperwork, and legal procedures, which can further delay the response and increase the complexity of handling malicious events. In contrast, smart contracts can establish a secure and automated channel of communication and action between a business entity and an official agency, thus providing greater efficiency, as smart contracts can enable the automatic and immediate execution of countermeasures against a malicious actor as soon as a trigger condition is met. For example, a smart contract can detect a suspicious activity on the business entity's network, verify it against a predefined set of rules, and trigger a response authorized by the official agency, such as blocking the malicious actor's access, freezing their assets, or launching an investigation. As such, the techniques described herein can significantly reduce the time and resources required to respond to a malicious action as well as minimize the damage to a business entity caused by a malicious actor.

Smart contracts can also provide a transparent and auditable record of the entire process of detecting, verifying, and responding to a malicious action. All parties involved in the smart contract can access the same information and monitor the progress of the response in real-time. Further, smart contracts can leverage the cryptographic features of blockchain technology to ensure the confidentiality, integrity, and authenticity of the communication and action between the business entity and the official agency. Smart contracts can also use multi-signature mechanisms to require the consensus of multiple parties before executing a countermeasure, thus preventing a single point of failure. As such, the techniques described herein can also enhance the trust and accountability between the business entity and the official agency.

Smart contracts can also be customized to meet the specific needs and preferences of the business entity and the official agency. Smart contracts can allow for different levels of automation, decision-making, and delegation of authority, depending on the severity and complexity of the malicious action. Smart contracts can also be designed to comply with relevant laws, regulations, and standards, and adapt to changing circumstances or feedback.

Thus, the use of smart contracts between a business entity and an official agency to execute authorized countermeasures against a malicious actor can offer a fast, secure, transparent, and flexible way to protect the business entity's assets, customers, and reputation from harm. As a result, the techniques described herein may enable a more collaborative and efficient approach to cybersecurity and crime prevention, and may further enhance the resilience, reliability, and competitiveness of a business entity.

In one example, this disclosure is directed to a system for a business entity, the system comprising one or more processors implemented in circuitry. The one or more processors are configured to: determine that a smart contract established between the business entity and an official agency defines an authorized countermeasure to be performed in the event of a malicious action; determine that a malicious actor has performed the malicious action on the business entity; and execute, in response to the determination that the malicious actor has performed the malicious action, the authorized countermeasure with respect to the malicious actor.

In another example, this disclosure is directed to a method comprising: determining, by a computing system for a business entity, that a smart contract established between the business entity and an official agency defines an authorized countermeasure to be performed in the event of a malicious action; determining, by the computing system, that a malicious actor has performed the malicious action on the business entity; and executing, by the computing system and in response to the determination that the malicious actor has performed the malicious action, the authorized countermeasure with respect to the malicious actor.

In a further example, this disclosure is directed to a computer-readable medium storing instructions that, when executed, cause one or more processors to: determine that a smart contract established between the business entity and an official agency defines an authorized countermeasure to be performed in the event of a malicious action; determine that a malicious actor has performed the malicious action on the business entity; and execute, in response to the determination that the malicious actor has performed the malicious action, the authorized countermeasure with respect to the malicious actor.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
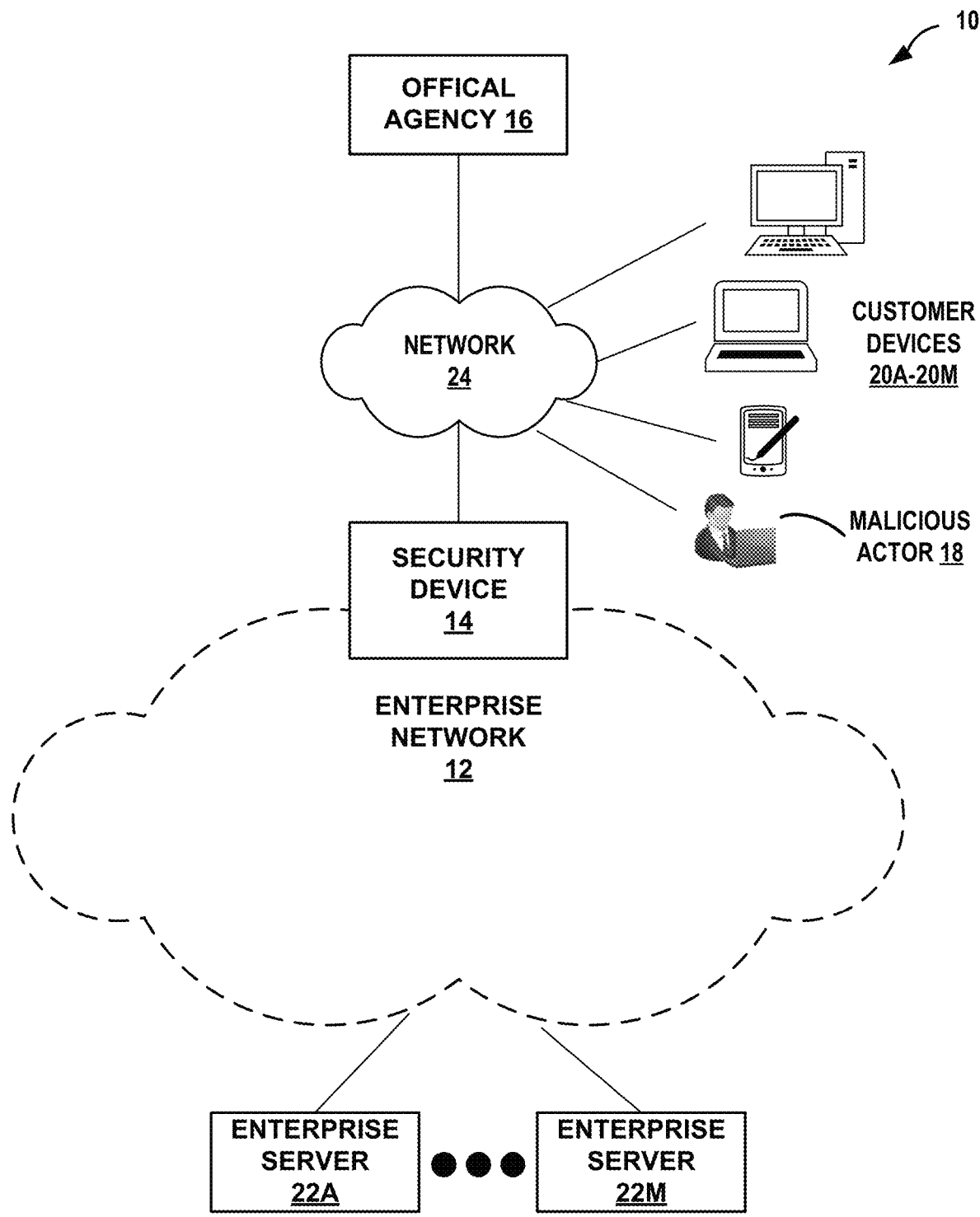
FIG. 1 is a block diagram illustrating an example network system that includes a security device configured to monitor enterprise network traffic from customer devices, in accordance with the techniques of this disclosure.

The disclosure describes techniques for executing authorized countermeasures via smart contracts against a malicious actor in response to the malicious actor performing a malicious action on a business entity. A system for the business entity may determine that a smart contract established between the business entity and an official agency defines an authorized countermeasure to be performed in the event of a malicious action. The system may further determine that a malicious actor has performed a malicious action on the business entity, and in response to the determination that the malicious actor has performed the malicious action, execute the authorized countermeasure with respect to the malicious actor.

In some examples, a security system included in an enterprise network associated with the business entity monitors network traffic from customer devices and malicious actors. In some examples, to determine that a malicious actor has performed a malicious action, the security system is configured to execute a machine learning model trained to detect the malicious action using historical data including good and malicious behavior incidents associated with the business entity. Responsive to determining that a malicious action has been performed by a malicious actor, the security system may communicate with a blockchain system on which the smart contract is stored to determine the authorized countermeasure to be performed. In some examples, the smart contract defines multiple authorized countermeasures to be performed based on the type of malicious action performed by the malicious actor. For example, in some examples, the authorized countermeasure includes one or more of a ransomware attack, a malware distribution, a beacon, a Distributed Denial of Service (DDOS) attack, a destruction of data, a devaluation of data, an encryption of data, a tokenization of data, or a scrambling of data. In other examples, wherein the malicious action comprises unauthorized access to data of the business entity, the authorized countermeasure comprises destruction of data including one of an erasure of the data or an overwriting of the data in an unreadable data format. The type of authorized countermeasure performed in response to the malicious action may be determined based on the nature of the attack, the location of the attack, and/or the identity or characteristics of the malicious actor.

It should be noted, however, that current legislation has made it illegal for a victim of a cyberattack to "hack-back," or perform a countermeasure against the malicious actor who initiated the cyberattack. However, in the instance that the countermeasures described herein have been legalized by an official agency, the smart contracts established between the official agency and a business entity may enable those authorized countermeasures to be performed in real-time, as smart contracts can be programmed to automatically execute specific actions when predetermined conditions are met.

Smart contracts utilize a blockchain to create a decentralized, tamper-proof ledger that records the contract's terms. When certain conditions are met, the contract code stored on the blockchain is automatically executed. These conditions can be triggered by events such as a certain date, a particular amount of cryptocurrency transfer, or specific data input. Smart contract code can be written in various programming languages, such as Solidity, which is frequently used for smart contracts on the Ethereum blockchain. Because the contract is on the blockchain, it is transparent and cannot be altered. Further, the terms of the contract are enforced without intermediaries, such as lawyers or escrow agents.

In addition to performing authorized countermeasures, the smart contract described herein could execute other measures that further protect the business entity. For example, a smart contract could be programmed to automatically freeze a user's account if suspicious activity is detected, such as multiple login attempts from different IP addresses. This may prevent the malicious actor from accessing sensitive data or performing fraudulent activities within the business platform or enterprise network. In another example, a smart contract could be used to manage access control. A smart contract could be used to automatically grant or revoke access to sensitive data or resources based on predetermined criteria, such as a user's role or level of clearance, thus preventing unauthorized access to sensitive information. The use of smart contracts in security systems has the potential to greatly enhance their effectiveness in detecting and responding to potential threats. As such, by automating authorized countermeasures against malicious actors with smart contracts, business entities can better protect themselves and their users from the ever-evolving landscape of cyberattacks.

In some examples, the smart contract may be established between the business entity and the official agency in real-time. In these examples, to determine the smart contract, the security system is configured to participate in a negotiation with the official agency to establish the smart contract. In some examples, the official agency is a law enforcement agency, a regulatory authority, a cybersecurity agency, other legal body that has jurisdiction to authorize counterattacks against malicious actors. Additionally, in some examples, the security system is configured to send a notification to the official agency indicating that the malicious action has been performed and that the authorized countermeasure has been executed in response. In some examples, the security system is also configured to store data for the smart contract, the detection of the malicious action, and the execution of the authorized countermeasure to the blockchain system.

FIG. 1 is a block diagram illustrating an example network system that includes a security device configured to monitor enterprise network traffic from customer devices, in accordance with the techniques of this disclosure. As shown in the example of FIG. 1, network system 10 includes enterprise network 12 that is associated with a business entity, wherein enterprise network 12 includes security system 14 that is in communication with official agency 16 via network 24. Security system 12 is configured to monitor network traffic from customer devices 20A-20M (collectively, "customer devices 20"), which may include malicious actor 18. Additionally, enterprise network 12 includes enterprise servers 22A-22M (collectively, "enterprise servers 22") that may store enterprise data and support various business systems and platforms.

In the example of FIG. 1, customer devices 20, malicious actor 18, security system 14 and are all in communication via network 24. In some examples, network 24 may be a public network, such as the Internet. Although illustrated as a single entity, network 24 may include a combination of two or more public and/or private networks. Network 24 may include one or more of a wide area network (WAN) (e.g., the Internet), a local area network (LAN), a virtual private network (VPN), or another wired or wireless communication network. In some examples, network 24 may be a service provider network coupled to one or more networks administered by other providers, and may thus form part of a large-scale public network infrastructure, e.g., the Internet.

Customer devices 20 may include desktop computers, laptops, workstations, wireless devices, or the like. Customer devices 20 may be required to pass through security device 14 before being granted access to enterprise network 12. In this way, security device 14 ensures the security and integrity of enterprise network 12. Customer devices 20 may establish a connection to security device 14 via network 24, which may be a public network, such as the Internet. Malicious actor 18 may be included in customer devices 20. Throughout this disclosure, malicious actor 18 may be defined as any one of customer devices 20 described herein that performs a malicious act against an enterprise or business entity. Furthermore, malicious actor 18 may or may not be intentionally "malicious." For example, in some examples, malicious actor 18 may simply be a user, customer, partner, licensee, etc. that violates an agreement (willfully or inadvertently) with a business entity, thus causing a smart contract to be triggered for the execution of a countermeasure. In some examples, the agreement between a user, customer, partner, licensee, etc. and the business entity may simply expire, which then may cause a smart contract to be triggered for the execution of a countermeasure (i.e., data devaluation, destruction, etc.).

Security device 14 may monitor and filter incoming and outgoing network traffic from customer devices 20. By requiring customer devices 20 to pass through security device 14 before accessing enterprise network 12, the enterprise or business entity can protect itself from unauthorized access and malicious attacks that could compromise the confidentiality, integrity, or availability of enterprise data and applications. Security device 14 may further determine whether malicious actor 18 has performed a malicious act.

Official agency 16 may establish a smart contract with a business entity associated with enterprise network 12 that defines an authorized countermeasure to be performed in the event of a malicious action. Official agency 16 may be an external device associated with a law enforcement agency, a regulatory authority, a cybersecurity agency, or some other official agency that is in communication with security device 14 via network 24. In response to security device 14 determining that malicious actor 18 has performed a malicious act, official agency 16 may receive a notification indicating the malicious act that took place. In some examples, the notification may include the type of malicious act performed, the location of the malicious act, or any other details regarding the malicious act. Official agency 16 has the legal authority to authorize a countermeasure executed against malicious actor 18. For example, official agency 16 may be associated with a government body that receives a notification from security device 14 that indicates malicious actor 18 has performed a malicious act against the business entity associated with enterprise network 12. Responsive to receiving this notification, official agency 16 may establish a smart contract with the business entity that executes an authorized countermeasure, such as a ransomware attack, a malware distribution, a beacon, a Distributed Denial of Service (DDOS) attack, a destruction of data, a devaluation of data, an encryption of data, a tokenization of data, or a scrambling of data, against malicious actor 18. In some examples, official agency 16 may receive a notification from security device 14 that indicates malicious actor 18 has performed a malicious act against the business entity associated with enterprise network 12, but does not establish a smart contract to execute the countermeasure. In those examples, the smart contract may be established between official agency 16 and the business entity prior to a malicious act occurring, and the authorized countermeasure may be automatically executed against malicious actor 18 by security device 12 upon the occurrence of the malicious act.

Enterprise servers 22 affiliated with enterprise network 12 may be a centralized or distributed system of computing devices that provide secure data storage, robust processing power, and networking capabilities to support various business applications for the enterprise or business entity that customer devices 20 can access. In some examples, enterprise servers 22 may support applications including email and messaging systems, customer relationship management (CRM) software, and enterprise resource planning (ERP) software. Enterprise servers 22 may also facilitate file sharing and collaboration among team members, as well as data backup and disaster recovery solutions. Enterprise servers 22 may handle high volumes of traffic and large datasets and provide a centralized platform for securely managing and protecting business data and applications.

Figure 2:
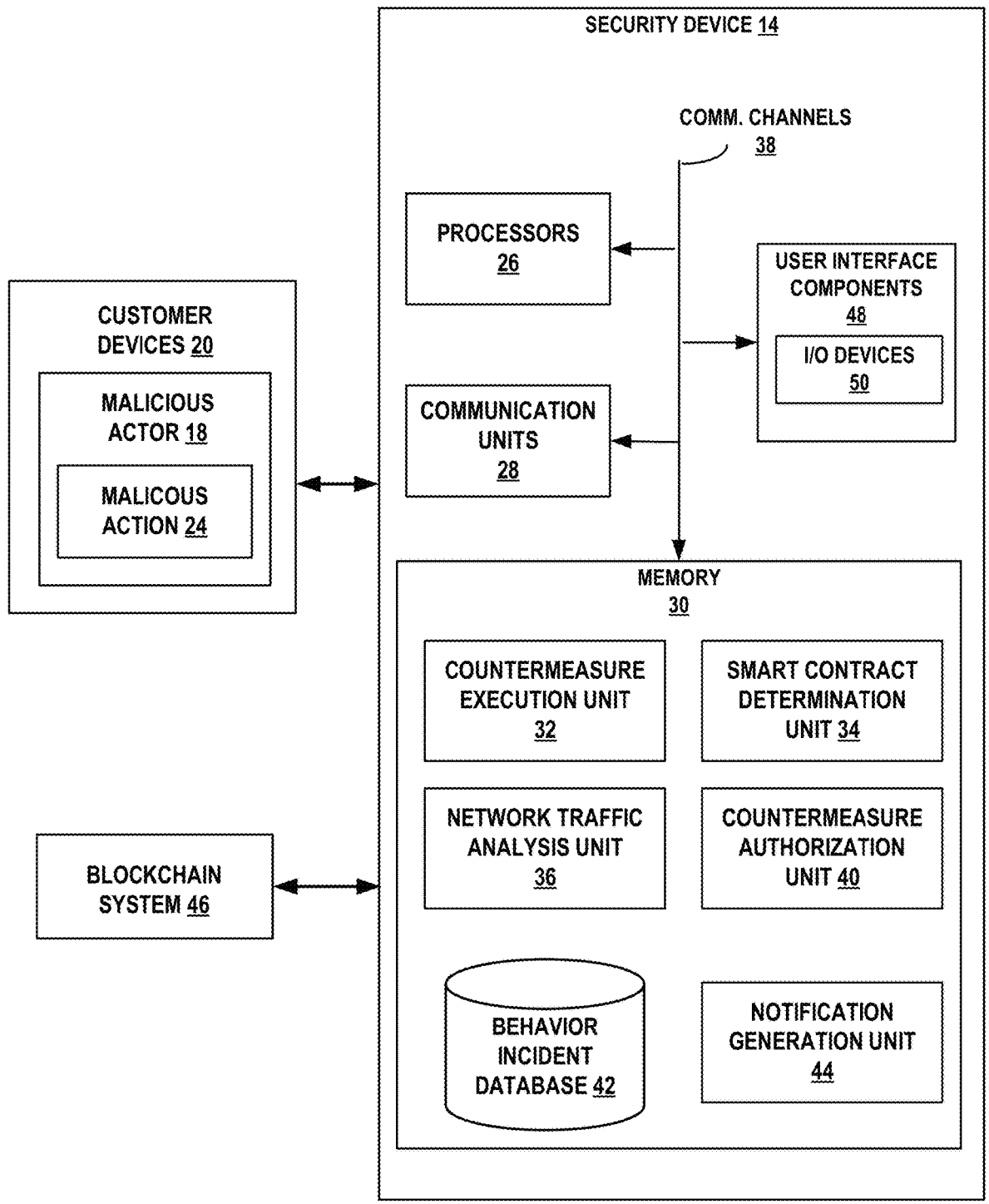
FIG. 2 is a block diagram illustrating example security device that is configured to monitor enterprise network traffic from customer devices and execute an authorized countermeasure against malicious actors, in accordance with the techniques of this disclosure.

FIG. 2 is a block diagram illustrating example security device 14 that is configured to monitor enterprise network traffic from customer devices 20 and execute an authorized countermeasure against malicious actor 18, in accordance with the techniques of this disclosure. As shown in the example of FIG. 2, security device 14 further includes processors 26, communication units 28, communication channels 38, user interface components 48 including I/O devices 50, and memory 30. Memory 30 further includes countermeasure execution unit 32, smart contract determination unit 34, network traffic analysis unit 36, countermeasure authorization unit 40, behavior incident database 42, and notification generation unit 44. Security device 14 may be in communication with blockchain system 48 as well as customer devices 20.

Memory 30 of security device 14 may also store an operating system (not shown) executable by processors 26 to control the operation of components of security device 14. The components, units, or modules of security device 14 may be coupled (physically, communicatively, and/or operatively) using communication channels 38 for inter-component communications. In some examples, communication channels 38 may include a system bus, a network connection, an inter-process communication data structure, or any other method for communicating data.

One or more processors 26 of security device 14 may implement functionality and/or execute instructions associated with security device 14 or associated with one or more modules illustrated herein and/or described below. One or more processors 26 may be, may be part of, and/or may include processing circuitry that performs operations in accordance with one or more aspects of the present disclosure. For example, one or more processors 26 may be capable of processing instructions stored by memory 30. One or more processors 26 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 30 may be configured to store information within security device 14 during operation. Memory 30 may include a computer-readable storage medium or computer-readable storage device. In some examples, memory 30 includes one or more of a short-term memory or a long-term memory. Memory 30 may include, for example, random access memories (RAM), dynamic random-access memories (DRAM), static random-access memories (SRAM), magnetic discs, optical discs, flash memories, or forms of electrically programmable memories (EPROM) or electrically erasable and programmable memories (EEPROM). In some examples, memory 30 is used to store program instructions for execution by processors 26. Memory 30 may be used by software or applications running on security device 14 to temporarily store information during program execution.

Security device 14 may utilize one or more communication units 28 to communicate with external devices via one or more networks, e.g., customer devices 20 or official agency 16 of FIG. 1. One or more communication units 28 may be network interfaces, such as Ethernet interfaces, optical transceivers, radio frequency (RF) transceivers, or any other type of devices that can send and receive information. Other examples of such network interfaces may include Wi-Fi, NFC, or Bluetooth® radios. In some examples, security device 14 utilizes one or more communication units 28 to communicate with external devices via one or more networks, e.g., official agency 16 via network 24 and/or customer devices 20 via network 24 of FIG. 1.

One or more input/output (I/O) devices 50 may represent any input devices of data security device 14 not otherwise separately described herein, and one or more output devices of security device 14 not otherwise separately described herein. I/O devices 50 may generate, receive, and/or process output from any type of device capable of outputting information to a human or machine. For example, one or more I/O devices 50 may generate, receive, and/or process input in the form of electrical, physical, audio, image, and/or visual input (e.g., peripheral device, keyboard, microphone, camera). Correspondingly, one or more I/O devices 50 may generate, receive, and/or process output in the form of electrical and/or physical output (e.g., peripheral device, actuator).

User interface components 48 of security device 14 may generate data representative of one or more user interfaces or graphical user interfaces (GUIs) for display on customer devices 20 and/or a device associated with the business entity or official agency 16 FIG. 1. As one example, user interface components 48 may generate data representative of a GUI for display on a device associated with official agency 16 that allows an official to receive requests for countermeasure authorization and send responses. In some examples, user interface components 48 may generate data representative of a GUI for display on a device associated with malicious actor 18 as part of an authorized countermeasure executed against malicious actor 18 by security device 14.

Blockchain system 46 may be a decentralized, distributed ledger that records transactions on a network. Blockchain system 46 may store smart contracts for executing an authorized countermeasure against malicious actor 18. Security device 14 may be connected to blockchain system 46 via a network. In some examples, blockchain system 26 may be Etheruem, a blockchain system that was created in 2015 by Vitalik Buterin. In some examples, blockchain system 26 may be Hyperledger Fabric, a blockchain system developed by the Linux Foundation that is designed for use in enterprise applications. In some examples, blockchain system 26 may be Ripple, a blockchain system that is designed for use in the financial industry. In some examples, blockchain system 26 may be Corda, a blockchain system developed by the consortium R3 that is also designed for use in the financial industry. In some examples, blockchain system 26 may be any other blockchain system that can meet the specific needs and requirements of the business entity described herein.

Prior to security device 14 executing authorized countermeasures against malicious actor 18, one or more processors 26 of security device 14 may participate in a negotiation with official agency 16 of FIG. 1 to establish a smart contract that is stored on blockchain system 46. The terms of the established smart contract may include triggers that would activate the execution of an authorized countermeasure by security device 14. For example, the smart contract may be designed to trigger a countermeasure if security device 14 detects a certain type of attack, such as a distributed denial-of-service (DDOS) attack. The terms of the established smart contract may also include instructions for security device 14 on how to execute the countermeasure once the smart contract has been triggered. These instructions may include specific rules or actions to be taken, such as blocking traffic from a particular IP address or redirecting traffic to a different server. The terms of the established smart contract may further include authorization requirements for the execution of an authorized countermeasure. For example, the smart contract may require that multiple parties, such as official agency 16 and the business entity, must approve the execution of a countermeasure before it can be carried out by security device 14. Lastly, the terms of the established smart contract may include reporting and notification requirements to ensure that all relevant parties are aware of the execution of an authorized countermeasure. For example, the smart contract may require that notifications be sent to official agency 16 and/or the business entity once an authorized countermeasure has been executed by security device 14.

Security device 14 may receive, from customer devices 20, which includes malicious actor 18, network traffic data that includes malicious action 24. In particular, network traffic analysis unit 36 may receive network traffic data from customer devices 20 and identify malicious action 24. Network traffic analysis unit 36 may be configured to analyze network traffic in real-time using various techniques, such as signature-based detection or behavioral analysis, to identify malicious events. In some examples, network traffic analysis unit 36 may use packet inspection and flow analysis to identify malicious events. In some examples, network traffic analysis unit 36 may include a trained machine learning model for identifying malicious events. Network traffic analysis unit 36 may utilize various machine learning algorithms to analyze network traffic and identify patterns that indicate the presence of malicious action 24. Network traffic analysis unit 36 may also receive behavior incident data from behavior incident database 42 as training data. Behavior incident database 42 is a database or other storage device that stores information about previous malicious events and authorized countermeasures that were executed by security device 14 in response. As such, the trained machine learning model may improve the accuracy and effectiveness of network traffic analysis unit 36.

In some examples, machine learning or artificial intelligence may be implemented to identify denial of service (DOS) attacks that take place against the business entity. For example, a DOS attack may include events that intentionally initiate smart contracts and negotiation processes with the purpose overwhelming the system. Machine learning or artificial intelligence may be incorporated by network traffic analysis unit 36 to identify such DOS attacks. In some examples, network traffic analysis unit 36 may also be configured to filter out noise, i.e., irrelevant or misleading data that may hinder the accurate detection of genuine attack signals.

In some examples, network traffic analysis unit 36 may be configured to detect other misleading or inaccurate data, such as simulated calls used for "Digital SWATing." Digital SWATing is a malicious act involving a false report being sent to emergency services that typically claims a serious threat or crime at a target's location, with the intention of provoking a response from law enforcement or other emergency response teams. Individuals may use various means to mask their identity and make false emergency calls, such as utilizing Voice over IP (VOIP) services to simulate the call from a different location. Network traffic analysis unit 36 may be configured to detect the use of such services to prevent malicious acts such as digital SWATing.

Smart contract determination unit 34 may be configured to determine if a smart contract is needed to execute an authorized countermeasure. If a smart contract is required, smart contract determination unit 34 may identify the relevant smart contract on blockchain system 46. In particular, smart contract determination unit 34 may be configured to determine if a smart contract established between the business entity and official agency 16 exists on blockchain system 46. Smart contract determination unit 34 may be further configured to determine that such a smart contract defines an authorized countermeasure to be performed in response to network traffic analysis unit 36 identifying malicious action 24. In addition to smart contract determination unit 34 determining that a smart contract established between the business entity and official agency 16 that defines an authorized countermeasure to be performed does exist on blockchain system 46, smart contract determination unit 34 may also determine that malicious actor 18 has performed malicious action 24 on the business entity. In some examples, smart contract determination unit 34 may receive information from network traffic analysis unit 36 that includes details of malicious action 24, such as the IP address of malicious actor 18 and the type of malicious action that occurred against the business entity. Responsive to smart contract determination unit 34 determining that that malicious actor 18 has performed malicious action 24 on the business entity, countermeasure execution unit 32 may then execute an authorized countermeasure against malicious actor 18. Countermeasure execution unit 32 may be further configured to receive, from blockchain system 46, instructions for executing the authorized countermeasure against malicious actor 18. For example, countermeasure execution unit 32 may receive, from blockchain system 46, instructions to block traffic from the IP address of malicious actor 18. The instructions received from blockchain system 46 are the instructions for carrying out the authorized countermeasure defined in the smart contract established between the business entity and official agency 16. Responsive to receiving instructions from blockchain system 46, countermeasure execution unit 32 may then execute those instructions against malicious actor 18. In some examples, countermeasure execution unit 32 may include a pre-defined set of actions that the smart contract on blockchain system 46 triggers. In those examples, the pre-defined set of actions may be defined by official agency 16 and/or established between the business entity and official agency 16.

In some examples, wherein malicious action 24 comprises unauthorized access to data of the business entity, the authorized countermeasure executed by countermeasure execution unit 32 comprises destruction of data, which may include an erasure of the data or an overwriting of the data in an unreadable data format.

In some examples, prior to countermeasure execution unit 32 executing an authorized countermeasure against malicious actor 18, countermeasure authorization unit 40 may first authorize the specific countermeasure to be executed. In those examples, countermeasure authorization unit 40 may send a request to the business entity and/or official agency 16 for the countermeasure to be authorized. The request may also include other information regarding malicious action 24, such as the identity or location of malicious actor 18 or the severity of malicious action 24. Responsive to receiving a response from the business entity and/or official agency 16 indicating that the countermeasure has been authorized, countermeasure authorization unit 40 may send, to countermeasure execution unit 32, instructions to execute the authorized countermeasure against malicious actor 18.

By providing an additional authorization step prior to executing an authorized countermeasure against malicious actor 18, a business entity may be better protected against unwanted countermeasures being performed. Additionally, the additional authorization step performed by countermeasure authorization unit 40 may prevent countermeasures being performed in response to scenarios unforeseen by the business entity and/or official agency 16 and therefore not taken into account when the terms of the smart contract were established.

Responsive to countermeasure execution unit 32 executing an authorized countermeasure against malicious actor 18, countermeasure execution unit 32 may send behavior incident data to behavior incident database 42. Behavior incident database 42 may then store the behavior incident data, which may include information regarding malicious actor 18, malicious action 24, and the authorized countermeasure executed by countermeasure execution unit 32. For example, responsive to countermeasure execution unit 32 executing instructions to block traffic from the IP address of malicious actor 18, countermeasure execution unit 32 may send, to behavior incident database 42, the IP address of malicious actor 18, the date, time, and severity of malicious action 24, and the type of authorized countermeasure that was executed. As mentioned above, behavior incident database 42 may also send stored data to network traffic analysis unit 36 as training data to train a machine learning model for identifying other malicious events included in the network traffic from customer devices 20.

Responsive to behavior incident database 42 storing behavior incident data for an authorized countermeasure executed in response to malicious action 24, notification generation unit 44 may generate a notification including some or all of the behavior incident data that is then sent to the business entity and/or official agency 16. For example, notification generation unit 44 may generate a notification including the IP address of malicious actor 18, the date, time, and severity of malicious action 24, and the type of authorized countermeasure that was executed to the business entity's security analysts or system administrators. As such, the business entity and/or official agency 16 may receive confirmation that the authorized countermeasure was executed against malicious actor 18.

In some examples, the data stored in behavior incident database 42 may also be sent to blockchain system 46. For example, security device 14 may send, to blockchain system 46, data indicative of the detection of malicious action 24 and the performance of the authorized countermeasure.

Figure 3:
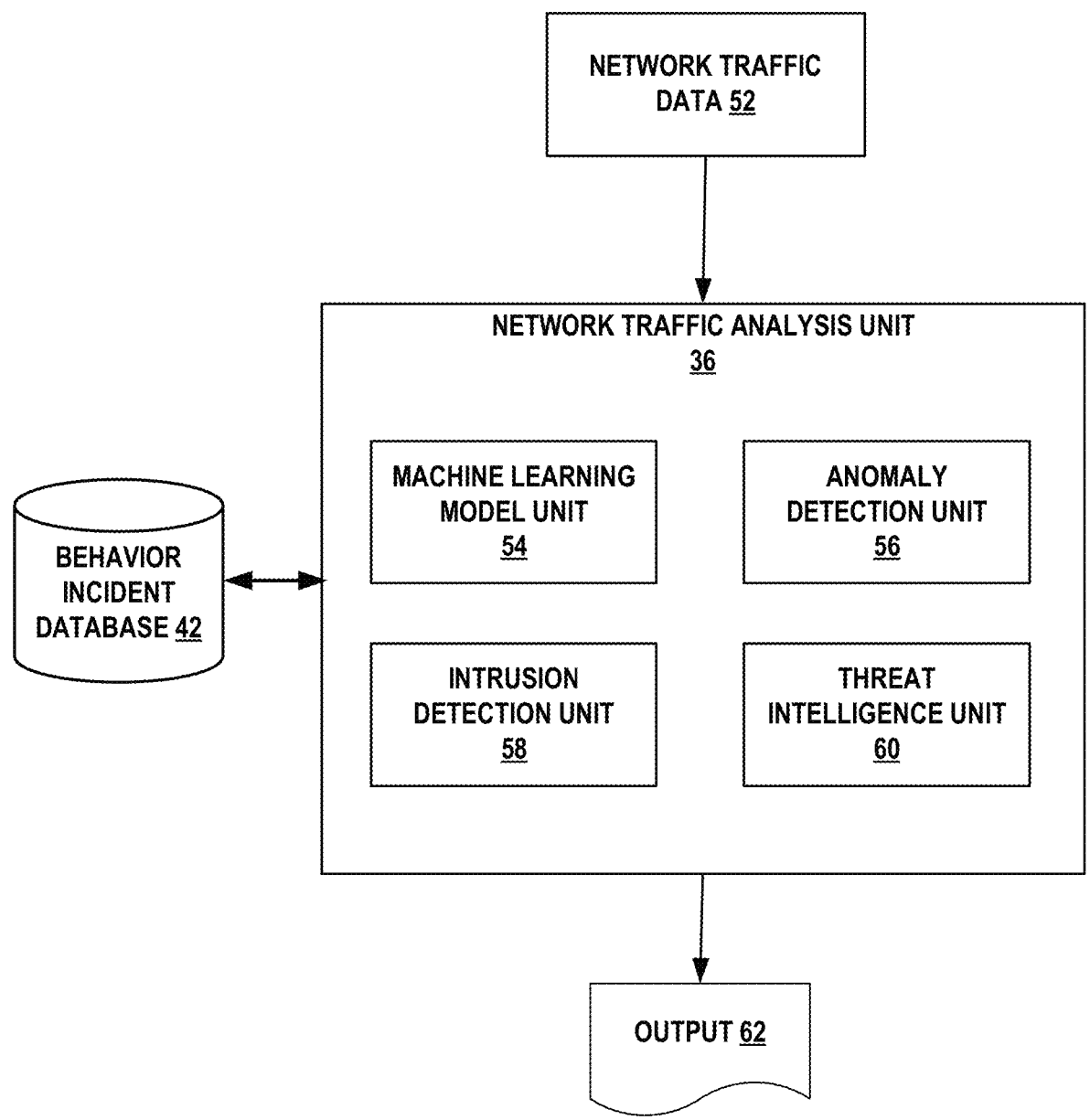
FIG. 3 is a block diagram further illustrating example network traffic analysis unit that is configured to monitor enterprise network traffic data from customer devices and identify malicious events, in accordance with the techniques of this disclosure.

FIG. 3 is a block diagram further illustrating example network traffic analysis unit 36 that is configured to monitor enterprise network traffic data 52 from customer devices and identify malicious events, in accordance with the techniques of this disclosure. As shown in the example of FIG. 3, network traffic analysis unit 36 includes machine learning model unit 54, anomaly detection unit 56, intrusion detection unit 58, and threat intelligence unit 60. Network traffic analysis unit 36 may be configured to receive behavior incident data from behavior incident database 42.

As described with respect to FIG. 2, network traffic analysis unit 36 may be configured to analyze network traffic in real-time to identify malicious events. In some examples, network traffic analysis unit 36 receives network traffic data 52 from customer devices 20 of FIGS. 1 and 2. In some examples, network traffic data 52 may include unique source and destination IP addresses for each customer device 20 that accesses enterprise network 12 of FIG. 1. The unique source and destination IP addresses may be used to identify the origin and destination of network traffic associated with the with a particular customer device 20. In some examples, network traffic data 52 may also include port numbers that are used to identify specific applications or services that are communicating over enterprise network 12. For example, web traffic typically uses port 80 or 443, while email traffic typically uses port 25 or 587. Network traffic data 52 may include the port numbers being used by the source and destination devices, such as customer devices 20 and a device associated with the business entity, which can help identify the types of applications or services being used. In some examples, network traffic data 52 may also include packet payloads, or the actual data being transmitted between devices. The packet payloads may include text, images, videos, and other types of data, depending on the specific application being used. In some examples, network traffic data 52 may also include protocol information for the different protocols used by different types of applications and services to communicate over the network. Network traffic data 52 may include information about the protocols being used, such as TCP, UDP, HTTP, or FTP. In some examples, network traffic data 52 may also include timing information for when packets are transmitted and received. Network traffic data 52 may include timestamps that can be used to track the duration of specific network sessions.

As described above, network traffic analysis unit may be configured to receive network traffic data 52 in real-time. As such, network traffic data 52 may be processed and analyzed as it is being transmitted over network 24. Real-time analysis of network traffic data 52 may allow for faster detection and response to potential security threats or malicious events, as threats can be identified and addressed as they are happening.

In some examples, network traffic data 52 may be analyzed by anomaly detection unit 56 and intrusion detection unit 58. Anomaly detection unit 56 may be configured to analyze network traffic patterns in network traffic data 52 and identify any anomalies or unusual activity that may indicate a malicious event. For example, anomaly detection unit 56 may analyze network traffic data 52 to identify any sudden increases in traffic from a particular IP address. In another example, anomaly detection unit 56 may analyze network traffic data 52 to identify unusual traffic patterns that may indicate a distributed attack. Intrusion detection unit 58 may be configured to monitor network traffic data 52 for specific intrusion patterns or signatures that may indicate an ongoing attack. For example, intrusion detection unit 58 may identify traffic patterns that match known attack signatures.

Threat intelligence unit 60 may include information pertaining to known attack methods and traffic patterns that indicate a malicious event. In some examples, threat intelligence unit 60 may receive information from external sources in communication with security device 14 that may then be used to adjust the monitoring and detection capabilities of anomaly detection unit 56 and intrusion detection unit 58.

In some examples, network traffic data 52 may be provided as input to machine learning model unit 54. Machine learning model unit 54 may be configured to detect malicious events in network traffic data 52 by analyzing patterns and anomalies using machine learning algorithms. A machine learning model of machine learning model unit 54 may be trained using historical behavior incident data received from behavior incident database 42. The historical behavior incident data may include both good and malicious behavior incidents associated with the business entity. For example, to train the machine learning model, the network traffic data included in the historical behavior incident data may first preprocessed to extract relevant features. These features may include source and destination IP addresses, port numbers, packet payloads, and protocol information that the model is then trained on. In some examples, the model may comprise a supervised learning algorithm that uses labeled data to learn how to identify malicious events. In those examples, the labeled data might include examples of network traffic data that have been classified as either malicious or benign. In some other examples, the type of machine learning algorithm may include, but is not limited to, decision trees, random forests, support vector machines (SVMs), and neural networks.

Machine learning model unit 54 may be used separately or in conjunction with anomaly detection unit 56 and intrusion detection unit 58. In some examples, data may be sent from anomaly detection unit 56 and/or intrusion detection unit 58 to machine learning model unit 54 that includes good and/or malicious patterns found in network traffic data 52. In some examples, all network traffic data 52 may be provided as input to machine learning model unit 54, in which network traffic analysis unit 36 only utilizes machine learning model unit 54 to identify malicious events. In any case, network traffic analysis unit 36 may be configured to generate output 62 that indicates a malicious event has been identified, whether by anomaly detection unit 56, intrusion detection unit 58, machine learning model unit 54, or a combination thereof. In some examples, output 62 may include data indicative of the malicious event that occurred. In some examples, output 62 may include the type of malicious event that was identified, source and destination IP addresses, port numbers, packet payloads, protocol information, and/or timestamps. Output 62 may then be sent to other components of security device 14, such as smart contract determination unit 34, to further carry out the execution of an authorized countermeasure defined in the smart contract established between the business entity and official agency 16. In some examples, the data included in output 62 may also be behavior incident database 42.

Figure 4:
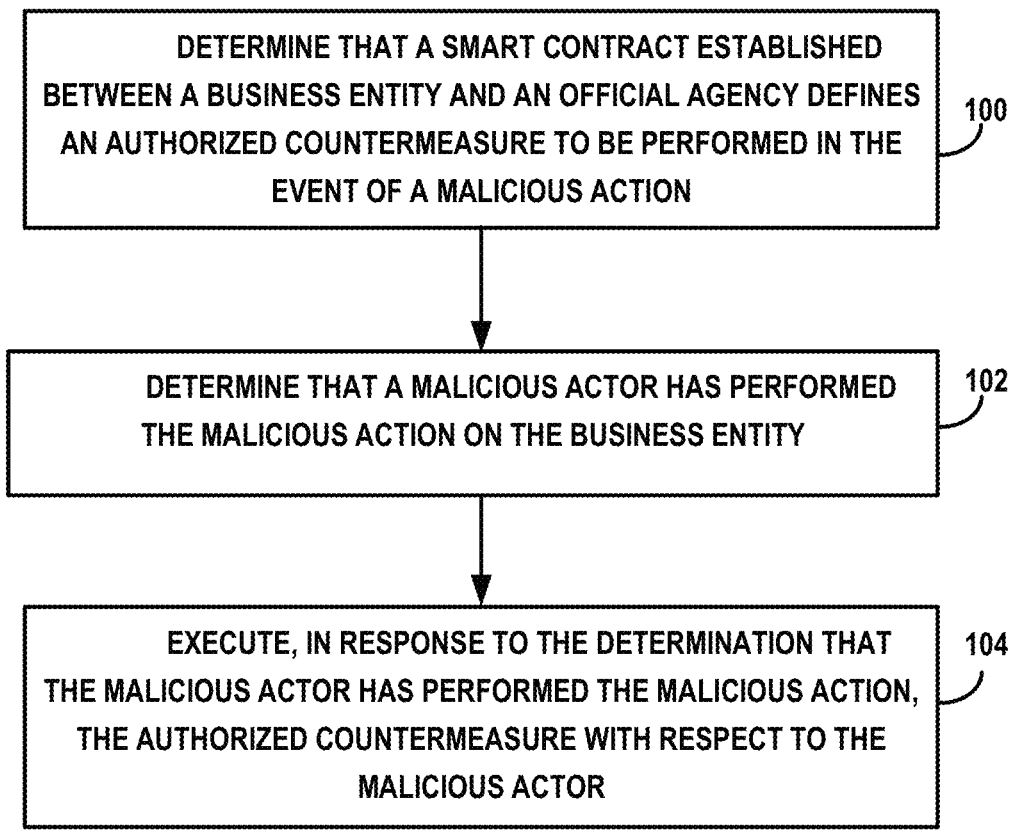
FIG. 4 is a flow chart illustrating an example operation of a system to facilitate the execution of a countermeasure against malicious actors, in accordance with the techniques of this disclosure.

FIG. 4 is a flow chart illustrating an example operation of a security device to facilitate the execution of a countermeasure against malicious actors, in accordance with the techniques of this disclosure. The example operation is described herein with respect to security device 14 of FIGS. 1-3. In other examples, other systems and/or computing devices may perform the example operation of FIG. 4.

A system for a business entity includes security device 14 that receives, via network 24, network traffic data 52 from customer devices 20 that include malicious actor 18. Network traffic analysis unit 36 of security device 14 analyzes network traffic data 52 to identify malicious action 24. In some examples, network traffic analysis unit 36 may utilize machine learning models trained on historical behavior incident data to determine if malicious action 24 exists within network traffic data 52. Responsive to identifying malicious action 24, network traffic analysis unit 36 may send output 62 that indicates malicious action 24 has been identified and includes information pertaining to malicious action 24, such as the type of malicious event that was identified, source and destination IP addresses, port numbers, packet payloads, protocol information, and/or timestamps.

Responsive to receiving output 62 from network traffic analysis unit 36, security device 14 determines that a smart contract established between the business entity and official agency 16 defines an authorized countermeasure to be performed in the event of malicious action 24 (100). In particular, smart contract determination unit 34 may determine if a smart contract established between the business entity and official agency 16 exists on blockchain system 46 that is in communication with security device 14. Smart contract determination unit 34 also determines that malicious actor 18 has performed malicious action 24 on the business entity (102). Smart contract determination unit 34 may determine that malicious actor 18 has performed malicious action 24 on the business entity based on the information included in output 62.

Responsive to smart contract determination unit 34 determining that malicious actor 18 has performed malicious action 24 on the business entity, countermeasure execution unit 32 then executes an authorized countermeasure against malicious actor 18 (104). Countermeasure execution unit 32 may receive, from blockchain system 46, instructions for executing the authorized countermeasure against malicious actor 18, wherein the instructions received from blockchain system 46 are the instructions for carrying out the authorized countermeasure defined in the smart contract established between the business entity and official agency 16. The authorized countermeasure may include one or more of a ransomware attack, a malware distribution, a beacon, a Distributed Denial of Service (DDOS) attack, a destruction of data, a devaluation of data, an encryption of data, a tokenization of data, or a scrambling of data. The authorized countermeasure may also include destruction of data, such as an erasure of data or an overwriting of data in an unreadable data format.

Responsive to countermeasure execution unit 32 executing the authorized countermeasure, notification generation unit 44 of security device 12 may generate and send a notification to official agency 16 indicating that malicious action 24 has been performed and that the authorized countermeasure has been performed in response. Security device 14 may store data for the detection of malicious action 24 and the performance of the authorized countermeasure to behavior incident database 42. Security device 14 may also store data for the smart contract, the detection of malicious action 24, and the performance of the authorized countermeasure to blockchain system 26.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are hereby incorporated by reference. To the extent that any such disclosure material that is incorporated by reference conflicts with the present disclosure, the present disclosure shall control.

For ease of illustration, only a limited number of devices or systems are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random access memory (RAM), read-only memory (ROM), electrically erasable and programmable ROM (EEPROM), compact disc ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application-specific integrated circuits (ASICs), field-programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computing system for a business entity, the computing system comprising one or more processors implemented in circuitry, the computing system being configured to:
send, to a device associated with an official agency, a request for an authorization to perform a countermeasure against a computing device in the event of a malicious action performed using the computing device, wherein the malicious action comprises unauthorized access to data of the business entity;
receive, from the device associated with the official agency, the authorization to perform the countermeasure in the event of the malicious action;
determine that a malicious actor device has performed the malicious action on the business entity by at least executing a machine learning model trained to detect the malicious action using historical data including good and malicious behavior incidents associated with the business entity; and
execute, in response to the determination that the malicious actor device has performed the malicious action, the authorized countermeasure against the malicious actor device, wherein the authorized countermeasure comprises destruction of data including one of an erasure of the data or an overwriting of the data in an unreadable data format.

2. The computing system of claim 1, wherein the authorized countermeasure further includes one or more of a ransomware attack, a malware distribution, a beacon, a Distributed Denial of Service (DDOS) attack, an encryption of data, a tokenization of data, or a scrambling of data.

3. The computing system of claim 1, wherein to receive the authorization to perform the countermeasure, the computing system is further configured to participate in a negotiation with the official agency to establish a smart contract.

4. The computing system of claim 1, wherein the computing system is further configured to send a notification to the device associated with the official agency indicating that the malicious action has been performed and that the authorized countermeasure has been performed in response.

5. The computing system of claim 1, wherein the computing system is further configured to store data for the authorization, the detection of the malicious action, and the performance of the authorized countermeasure to a blockchain system.

6. A method comprising:
sending, by one or more processors, and to a device associated with an official agency, a request for an authorization to perform a countermeasure against a computing device in the event of a malicious action performed using the computing device, wherein the malicious action comprises unauthorized access to data of the business entity;
receiving, by the one or more processors, and from the device associated with the official agency, the authorization to perform the countermeasure in the event of the malicious action;
determining, by the one or more processors, that a malicious actor device has performed the malicious action on a business entity by at least executing a machine learning model trained to detect the malicious action using historical data including good and malicious behavior incidents associated with the business entity; and
executing, by the one or more processors and in response to the determination that the malicious actor device has performed the malicious action, the authorized countermeasure against the malicious actor device, wherein the authorized countermeasure comprises destruction of data including one of an erasure of the data or an overwriting of the data in an unreadable data format.

7. The method of claim 6, wherein the authorized countermeasure further includes one or more of a ransomware attack, a malware distribution, a beacon, a Distributed Denial of Service (DDOS) attack, an encryption of data, a tokenization of data, or a scrambling of data.

8. The method of claim 6, wherein receiving the authorization to perform the countermeasure further comprises participating in a negotiation with the official agency to establish a smart contract.

9. The method of claim 6, wherein the method further comprises sending, by the one or more processors, a notification to the device associated with the official agency indicating that the malicious action has been performed and that the authorized countermeasure has been performed in response.

10. The method of claim 6, wherein the method further comprises storing, by the one or more processors, data for the authorization, the detection of the malicious action, and the performance of the authorized countermeasure to a blockchain system.

11. A non-transitory computer-readable medium storing instructions that, when executed, cause one or more processors to:
send, to a device associated with an official agency, a request for an authorization to perform a countermeasure against a computing device in the event of a malicious action performed using the computing device, wherein the malicious action comprises unauthorized access to data of the business entity;
receive, from the device associated with the official agency, the authorization to perform the countermeasure in the event of the malicious action;
determine that a malicious actor device has performed the malicious action on the business entity by at least execution of a machine learning model trained to detect the malicious action using historical data including good and malicious behavior incidents associated with the business entity; and
execute, in response to the determination that the malicious actor device has performed the malicious action, the authorized countermeasure against the malicious actor device, wherein the authorized countermeasure comprises destruction of data including one of an erasure of the data or an overwriting of the data in an unreadable data format.

12. The non-transitory computer-readable medium of claim 11, wherein the authorized countermeasure further includes one of a ransomware attack, a malware distribution, a beacon, a Distributed Denial of Service (DDOS) attack, an encryption of data, a tokenization of data, or a scrambling of data.

13. The non-transitory computer-readable medium of claim 11, wherein to receive the authorization to perform the countermeasure, the instructions further cause the one or more processors to participate in a negotiation with the official agency to establish a smart contract.

14. The non-transitory computer-readable medium of claim 11, wherein the instructions further cause the one or more processors to send a notification to the device associated with the official agency indicating that the malicious action has been performed and that the authorized countermeasure has been performed in response.

15. The non-transitory computer-readable medium of claim 11, wherein the instructions further cause the one or more processors to store data for the authorization, the detection of the malicious action, and the performance of the authorized countermeasure to a blockchain system.

\* \* \* \* \*